L. J. ROBB.
DEVICE FOR TRANSFERRING GLASSWARE TO LEERS.
APPLICATION FILED SEPT. 27, 1906.
927,168.
Patented July 6, 1909.
2 SHEETS—SHEET 1.
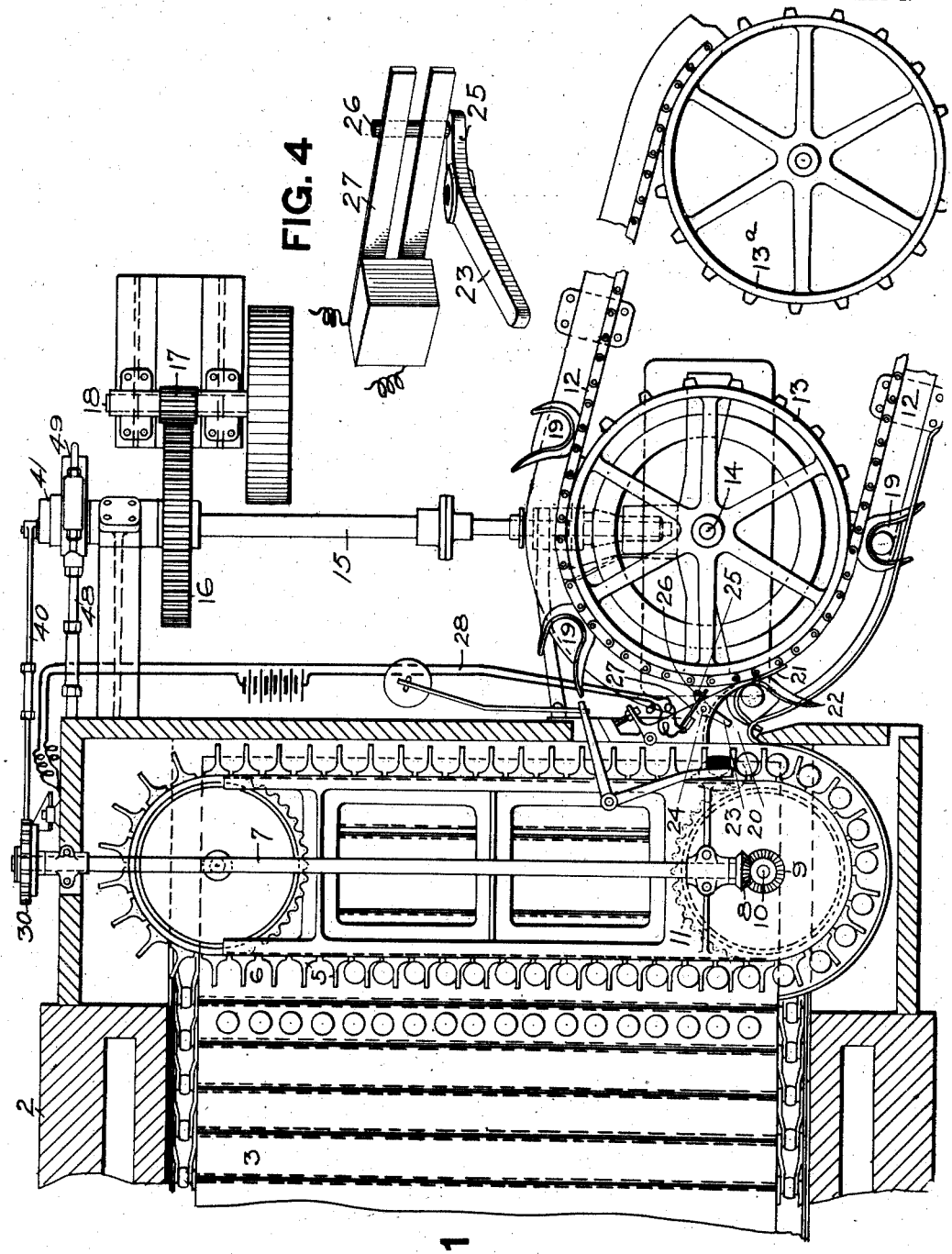
WITNESSES.
INVENTOR.

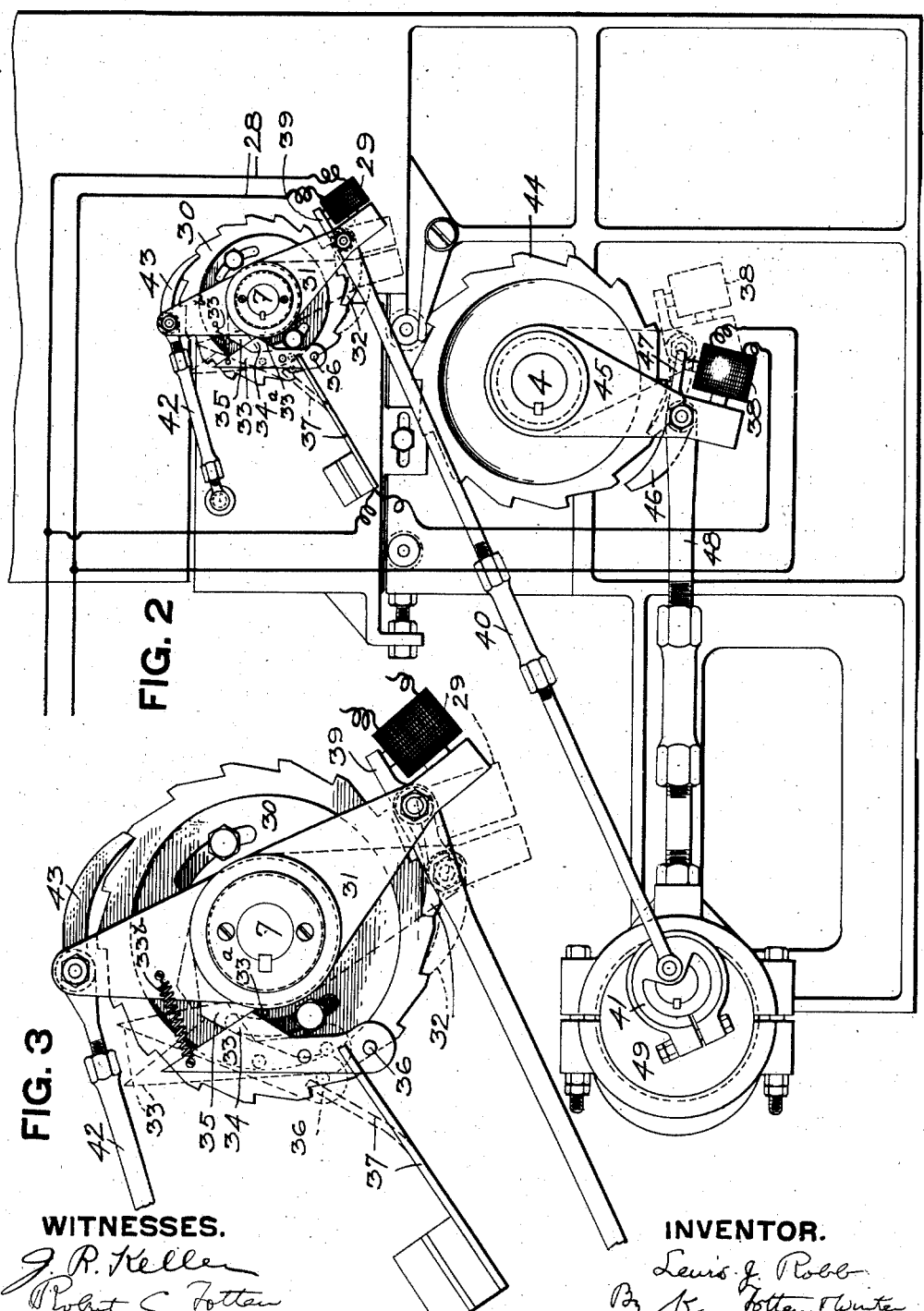

UNITED STATES PATENT OFFICE.

LEWIS J. ROBB, OF PITTSBURG, PENNSYLVANIA, ASSIGNOR TO HEYL & PATTERSON INCORPORATED, OF PITTSBURG, PENNSYLVANIA, A CORPORATION OF PENNSYLVANIA.

DEVICE FOR TRANSFERRING GLASSWARE TO LEERS.

No. 927,168.　　　Specification of Letters Patent.　　　Patented July 6, 1909.

Application filed September 27, 1906. Serial No. 336,457.

*To all whom it may concern:*

Be it known that I, LEWIS J. ROBB, a resident of Pittsburg, in the county of Allegheny and State of Pennsylvania, have invented a new and useful Improvement in Devices for Transferring Glassware to Leers; and I do hereby declare the following to be a full, clear, and exact description thereof.

My invention relates to apparatus for conveying glassware to leers, and more especially to an electrical device for actuating the trips of the transfer conveyer and leer conveyer, such as set forth and claimed in a certain application for Letters Patent of the United States filed by Charles R. Knapp and Virgil Mulholland, Serial No. 254,576, and to which I make no claim.

In the above named application a trip-arm is located in the path of the ware as it passes to the transfer conveyer into contact with which the ware comes, and by the movement of which through certain mechanism an intermittent movement is imparted to the transfer conveyer and finally to the leer conveyer after a row of ware has been arranged upon one of the pans of the leer.

The object of my invention is to provide electrical connections between the tripper arm and the mechanism for imparting the intermittent movement to the transfer conveyer and leer conveyer so as to simplify the construction and at the same time insure the operation of such mechanical device, each time a piece of ware is carried to the transfer conveyer.

To these ends my invention comprises the novel features hereinafter set forth and claimed.

In the accompanying drawings Figure 1 represents a plan view and section of a portion of the device for conveying glassware to leers. Fig. 2 is an enlarged side elevation of the mechanism for imparting movement to the transfer conveyer and the leer conveyer. Fig. 3 is an enlarged detail of the tripper mechanism and its electrical connections; Fig. 4 is an enlarged view of tripper and switch.

In the drawings, the numeral 2 designates a suitable leer within which is arranged the leer conveyer, 3, consisting of pans secured to endless chains traveling on sprocket wheels at opposite ends of the leer, as is well known.

The numeral 4 indicates the shaft at the forward end of the leer, by means of which the leer conveyer is driven and intermittent movement imparted thereto.

Within the forward end of the leer is the transfer conveyer 5, which consists of a chain and flights, 6, arranged at suitable intervals thereon, the ware being received within the space formed by the adjacent flights. This transfer conveyer is operated by the shaft 7, which has the bevel gear 8 thereon, meshing with bevel gears 9 on the vertical shaft 10, which carries the sprockets 11 by means of which the transfer conveyer is driven.

Located in front of the leer, and adapted to convey the ware thereto from the shops, is the ware-carrier 12, which passes around the sprocket wheels 13 and 13$^a$. This sprocket wheel 13 is mounted on the vertical shaft 14, and said shaft 14 is driven by the shaft 15. This shaft 15 has the gear wheel 16 thereon, which is engaged by the pinion 17 upon the shaft 18, of a motor or suitable engine.

The ware-carrier 12, has pans 19, thereon, adapted to support the ware and convey said ware up to the opening 20 in front of the leer. A guide, 21, is adapted to direct the ware carrier into the spaces between the flights of the transfer conveyer, and the pans 19, have the arms 22, which engage the ware from the rear and carry it forward along the guide 21.

In the path of the ware, as it moves along the guide 21 is the trip arm 23 which is pivoted at 24. This trip arm 23 has the projection 25, carrying the pin 26, which pin is adapted to engage the switch 27, and so form the circuit through the wires 28, to magnetize the magnet 29, for the purpose fully hereinafter set forth.

Mounted on the shaft 7, is the ratchet wheel 30. Loosely mounted on the shaft 7 is the lever arm, 31, which carries the pawl 32, said pawl being so mounted as to be normally out of engagement with the teeth of the ratchet 30. Pivoted to the ratchet 30 is a pawl 33, with a projection 34, with which a toe on lever 31 is adapted to engage. At the lower end of the pawl 33, is the insulated pin 36, which is adapted to engage the switch 37, once on each complete revolution of the ratchet wheel 30. A stop 33$^a$ on the ratchet 30 controls the movement of the pawl 33. A spring 33$^b$ normally holds the pawl 33 in engagement with the stop 33$^a$. The contact of the pin 36, with the switch 37, makes the circuit, by means of which the magnet 38, is magnetized for the purpose fully hereinafter set forth.

The pawl 32 has the tail portion 39, which is contiguous to the magnet 29, and said magnet, when energized, draws said tail portion 39, thereto, and throws the pawl 32, into engagement with the teeth of the ratchet. A pitman, 40, connects the lever, 31, to the eccentric 41, upon the shaft 15, said pitman, 40, being constantly reciprocated by said eccentric. A rod, 42, carries a pawl, 43, which is adapted to engage the ratchet wheel 30, and prevent its backward movement.

Mounted on the shaft 4, is the ratchet wheel, 44, and loosely mounted on the shaft 4, is the lever arm 45, which carries the pawl 46, said pawl being so mounted thereon as to be normally out of engagement with the teeth of the ratchet wheel 44. The pawl 46, has the tail piece 47, which is adapted to be attracted by the magnet 38, whereby the pawl 46, is thrown into engagement with the ratchet wheel 44.

A pitman, 48, connects the lever 45 with the eccentric 49, on the shaft 15, to impart a reciprocating movement to said pitman.

When the device is in operation, the bottle or other piece of ware, coming in contact with the tripper arm, 23, will move said arm so as to throw the extension 25, into engagement with the switch 27, whereupon the circuit will be completed and the magnet 29, energized. This will draw the tail 39, of the pawl 32, into engagement with the magnet and throw the pawl 32, into engagement with the ratchet, whereupon the reciprocating movement of the pitman 40, will act to move the ratchet wheel, 30, the distance of one tooth. This intermittent movement will be imparted to the ratchet wheel 36, each time a piece of ware comes in contact with the tripper arm 23, so that each time a piece of ware is introduced between the flights of the transfer conveyer, said conveyer will be moved one step. This operation continues until a line of ware has been formed along one of the pans of the leer conveyer. In the present instance each leer pan is intended to hold 18 pieces of ware and as a consequence the ratchet-wheel 30, has 18 teeth to provide for this number of bottles. As the last bottle is arranged upon the leer pan, the pin 36, upon the pawl 33, will move into contact with the switch 37, and move said switch to the position indicated in dotted lines. This contact of the pin 36, with the switch 37, will complete the circuit to the magnet 38, and magnetize the same so as to draw the tail 47, of the pawl 46, into engagement therewith, and throw said pawl into engagement with the ratchet-wheel, 44. On the return stroke of the lever 31 its toe piece 35, will come into engagement with the projection 34, on the pawl 33, and will move said pawl so as to throw the pin 36, out of engagement with the switch 37, whereby said switch is tripped and the circuit is broken and the magnet 38, demagnetized. Prior to this, however, the pawl 46, has been in engagement with the ratchet-wheel 44, and after the last bottle has been arranged upon the leer pan the movement is imparted to the ratchet-wheel 44, by the pawl 46, operated by the pitman 48, so that said ratchet is moved the distance of one tooth. This will act to move the leer pan, which has been loaded, rearwardly into the leer. Each time the ratchet-wheel 30, makes a complete revolution, the pin 36, on the pawl 33, will operate the switch 37, and through the connections described, operate the leer conveyer. Where, however, no piece of ware passes into the transfer conveyer, no operation of the mechanism takes place, and as a consequence, the leer conveyer does not move.

What I claim is:

1. In apparatus of the character described, the combination of a leer-conveyer, a ware-carrier adapted to convey the ware to the leer, transfer mechanism, a trip-arm in the path of the ware, ratchet and pawl mechanism for imparting an intermittent movement to said transfer mechanism, a magnet contiguous to said pawl, electrical connections between said trip-arm and said magnet, a ratchet and pawl for operating said leer-conveyer, a magnet contiguous to said pawl, a switch in the path of said first named ratchet, and connections between said switch and said last named magnet.

2. In apparatus of the character described, the combination of a leer conveyer, a ware-carrier adapted to convey the ware to the leer, transfer mechanism, a trip-arm in the path of the ware, ratchet and pawl mechanism for imparting an intermittent movement to said transfer mechanism, a lever arm on the ratchet shaft carrying said pawl, mechanism for reciprocating said lever-arm, a magnet contiguous to said pawl, electrical connections between said trip-arm and said magnet, a ratchet and pawl for operating said leer-conveyer a magnet contiguous to said pawl, a switch in the path of a projection on said first named ratchet, means for tripping said switch, and connections between said switch and said last named magnet.

3. In apparatus of the character described, the combination of a leer-conveyer, a ware-carrier adapted to convey the ware to the leer, transfer mechanism, a trip-arm in the path of the ware, ratchet and pawl mechanism for imparting an intermittent movement to said transfer mechanism, a lever-arm on the ratchet shaft carrying said pawl, mechanism for reciprocating said lever-arm, a magnet contiguous to said pawl, electrical connections between said trip-arm and said magnet, a ratchet and pawl for operating said leer-conveyer, a magnet contiguous to said pawl, a switch, a tripping pawl on said first ratchet adapted to engage said switch, said pawl being tripped by said lever, and connections between said switch and said last named magnet.

4. In apparatus of the character described, the combination of a leer-conveyer, a ware-carrier adapted to convey the ware to the leer, transfer mechanism, a trip-arm in the path of the ware, ratchet and pawl mechanism for imparting an intermittent movement to said transfer mechanism, a lever arm on the ratchet shaft carrying said pawl, mechanism for reciprocating said lever-arm, a magnet contiguous to said pawl, electrical connections between said trip-arm and said magnet, a ratchet and pawl for operating said leer conveyer, a magnet contiguous to said pawl, a switch, a tripping pawl on said first ratchet adapted to engage said switch, said pawl being tripped by said lever, a stop for said pawl, a spring connected to said pawl and to said ratchet, and connections between said switch and said last named magnet.

In testimony whereof, I the said LEWIS J. ROBB have hereunto set my hand.

LEWIS J. ROBB.

Witnesses:
M. D. VOGEL,
ROBT. D. TOTTEN.